US009815984B2

(12) United States Patent
Avramidis et al.

(10) Patent No.: US 9,815,984 B2
(45) Date of Patent: Nov. 14, 2017

(54) NON-CARBOXYLATED STYRENE-BUTADIENE COPOLYMERS, PREPARATION METHOD AND USE THEREOF

(71) Applicant: BASF SE, Ludwigshafen (DE)

(72) Inventors: Kostas S. Avramidis, Charlotte, NC (US); William J. Kirk, York, SC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/180,778

(22) Filed: Jun. 13, 2016

(65) Prior Publication Data
US 2016/0289451 A1 Oct. 6, 2016

Related U.S. Application Data

(62) Division of application No. 14/478,802, filed on Sep. 5, 2014, now Pat. No. 9,365,707, which is a division of application No. 13/879,326, filed as application No. PCT/IB2011/054531 on Oct. 13, 2011, now Pat. No. 8,952,092.

(60) Provisional application No. 61/393,189, filed on Oct. 14, 2010.

(51) Int. Cl.
| C08L 95/00 | (2006.01) |
| C08L 25/10 | (2006.01) |
| C08L 9/06 | (2006.01) |
| C08K 3/20 | (2006.01) |
| C08K 11/00 | (2006.01) |
| C08L 47/00 | (2006.01) |
| C08F 212/08 | (2006.01) |
| C04B 26/26 | (2006.01) |

(52) U.S. Cl.
CPC .......... *C08L 95/005* (2013.01); *C04B 26/26* (2013.01); *C08F 212/08* (2013.01); *C08K 3/20* (2013.01); *C08K 11/00* (2013.01); *C08L 9/06* (2013.01); *C08L 25/10* (2013.01); *C08L 47/00* (2013.01); *C08L 95/00* (2013.01); *C08L 2205/02* (2013.01); *C08L 2205/025* (2013.01); *C08L 2555/20* (2013.01); *C08L 2555/28* (2013.01); *C08L 2555/80* (2013.01); *C08L 2555/84* (2013.01)

(58) Field of Classification Search
CPC ........ C08L 95/005; C08L 95/00; C08L 25/10; C08L 9/06; C08L 47/00; C08L 2555/20; C08L 2555/28; C08L 2555/80; C08L 2555/84; C08L 2205/02; C08L 2205/025; C04B 26/26; C08K 3/20; C08K 11/00; C08F 212/08
USPC ...................................................... 524/577
See application file for complete search history.

(56) References Cited

U.S. PATENT DOCUMENTS

| 5,045,576 | A | 9/1991 | Roeck et al. | |
| 6,087,420 | A * | 7/2000 | Planche | C08K 3/06 427/138 |
| 6,150,439 | A * | 11/2000 | Keiichi | C08L 53/02 524/59 |
| 6,451,886 | B1 | 9/2002 | Krivohlavek et al. | |
| 8,952,092 | B2 | 2/2015 | Avramidis et al. | |
| 2007/0238825 | A1 | 10/2007 | Takamura et al. | |
| 2008/0146719 | A1* | 6/2008 | Yang | B60C 1/0008 524/445 |
| 2009/0092846 | A1* | 4/2009 | Takamura | C04B 41/009 428/480 |
| 2009/0298998 | A1 | 12/2009 | Takamura et al. | |
| 2010/0047015 | A1* | 2/2010 | Takamura | E01C 7/353 404/31 |

FOREIGN PATENT DOCUMENTS

| DE | 258918 | 8/1988 | |
| DE | 3830679 | 9/1989 | |
| JP | 2004352901 | 12/2004 | |
| JP | WO 2007026704 A1 * | 3/2007 | ............ C08F 212/08 |
| WO | 2007026704 | 3/2007 | |
| WO | 2012049650 | 4/2012 | |
| WO | 2012049651 | 4/2012 | |

OTHER PUBLICATIONS

Cui et al. "Properties of asphalts modified with styrene-butadiene rubber under different conditions", Hecheng Xiangjiao Gongye (2011), 34(4), 305-309 (STIC search, pp. 9-10).*
European Search Report dated Mar. 21, 2014, for related European Patent Application No. 11832216.3.
European Search Report dated Mar. 17, 2014, for related European Patent Application No. 11832217.1.
Office Action dated Dec. 5, 2014, for related European Patent Application No. 11832217.1.
International Search Report dated Feb. 9, 2012, in related International Application No. PCT/IB2011/054531.
Written Opinion dated Feb. 9, 2012, in related International Application No. PCT/IB2011/054531.
International Preliminary Report on Patentability and Written Opinion, dated Apr. 16, 2013, in related International Application No. PCT/IB2011/054531.
International Search Report dated Feb. 9, 2012, in related International Application No. PCT/IB2011/054533.
Written Opinion dated Feb. 9, 2012, in related International Application No. PCT/IB2011/054533.
International Preliminary Report on Patentability and Written Opinion, dated Apr. 25, 2013, in related International Application No. PCT/IB2011/054533.
Office Action dated Apr. 28, 2014 in related Chinese Application No. 201180059621.1.

* cited by examiner

*Primary Examiner* — Michael M Bernshteyn
(74) *Attorney, Agent, or Firm* — Meunier Carlin & Curfman LLC

(57) ABSTRACT

A non-carboxylated styrene-butadiene copolymer, preparation method and use thereof are provided. The non-carboxylated styrene-butadiene copolymer is prepared by hot polymerization in the absence of acid monomers and is used in asphalt-based systems such as asphalt emulsions.

6 Claims, No Drawings

NON-CARBOXYLATED STYRENE-BUTADIENE COPOLYMERS, PREPARATION METHOD AND USE THEREOF

CROSS-REFERENCE TO RELATED APPLICATIONS

This application claims the benefit of priority to U.S. patent application Ser. No. 14/478,802 filed Sep. 5, 2014, now U.S. Pat. No. 9,365,707, which is a divisional of U.S. patent application Ser. No. 13/879,326 filed Jul. 9, 2013, now U.S. Pat. No. 8,952,092, which is a §371 of International Application No. PCT/IB2011/054531 filed Oct. 13, 2011, which claims the benefit of priority to Provisional Application No. 61/393,189 filed Oct. 14, 2010, all of which are incorporated by reference herein in their entirety.

BACKGROUND

Styrene-butadiene polymer dispersions are useful in the production of several products, including vehicle tires, carpet backing, adhesives, foams, paper coatings and asphalt emulsions. There are two common methods for producing styrene-butadiene copolymer dispersions: a low temperature method (i.e., cold polymerization) and a high temperature method (i.e., hot polymerization). The low temperature method of producing styrene-butadiene copolymer dispersions involves polymerizing styrene and butadiene monomers at temperatures typically between 5° C. and 25° C. in the presence of a surfactant and in the absence of a carboxylated acid comonomer to produce a "cold" styrene butadiene rubber (SBR) copolymer. The low temperature method can be used to make high molecular weight polymers without introducing excess crosslinking. Unlike the low temperature method, the high temperature method for producing styrene-butadiene copolymer dispersions involves polymerizing styrene and butadiene monomers at temperatures in excess of 40° C., and generally in the range of 50-95° C., in the presence of a surfactant and a carboxylated acid monomer.

The low temperature method of producing styrene-butadiene copolymer dispersions has generally been used for producing styrene-butadiene polymer dispersions for many of the above-described uses because it can be agglomerated to produce a high solids content dispersion typically in excess of 65% solids and can be crosslinked (i.e., cured) to increase the tensile strength of the SBR without significantly reducing its elongation. The hot polymerization method, on the other hand, generally is believed to be only useful for producing styrene-butadiene copolymer dispersions having a narrow particle size distribution and a solids content below 55% making the dispersions useful for products such as paper coatings where polymer solids greater than 60% are not required and where the presence of carboxylation provides latex particle stability in the high shear environments encountered in the production of such products. Therefore, the hot polymerization method has generally only been desirable for paper coatings and some low solids pressure sensitive adhesive applications.

One issue with low temperature SBR aqueous dispersions is that they generally cannot be used in hot mix asphalt formulations such as those used in road paving and asphalt shingle applications. Hot mix asphalt formulations for road paving must comply with the requirements set forth in the Strategic Highway Research Program (SHRP) including having a desired dynamic shear modulus and stiffness. High molecular weight non-carboxylated SBR aqueous dispersions produce an undesired increase in viscosity of the hot mix asphalt formulation, making it difficult to uniformly apply the formulation to a surface. Low molecular weight non-carboxylated latex polymers can produce lower viscosity hot mix asphalt formulations; however, they do not have the desired SHRP performance properties.

SUMMARY

A styrene-butadiene copolymer, a method of making a styrene-butadiene copolymer, and methods and compositions including a styrene-butadiene copolymer are disclosed. The styrene-butadiene copolymer is made using a high temperature method at a temperature of 40° C. or greater resulting in a styrene-butadiene copolymer comprising styrene and butadiene monomer units. The copolymer does not include acid monomer units, i.e., is non-carboxylated and is cured (vulcanized) such as by using a sulfur curing agent. The copolymer can include cis-1,4 butadiene units in an amount greater than 20% and trans-1,4 butadiene units in an amount less than 60% of the total number of butadiene units in the copolymer. In some embodiments, the weight ratio of styrene to butadiene monomer units in the copolymer is 20:80 to 80:20. The copolymer can be derived from only styrene and butadiene monomers or can include other monomers (e.g., acrylonitrile or acrylamide) or molecular weight regulators. In some embodiments, the copolymer has a soluble portion that has a weight-average molecular weight of less than 400,000 g/mol or less than 200,000 g/mol and a number-average molecular weight of less than 20,000 g/mol, as measured by Gel Permeation Chromatography (GPC). In some embodiments, the copolymer can have a gel content of from 0% to 40% or from 70% to 100%. The copolymer can be provided in an aqueous dispersion and modified to have an overall cationic charge.

A method of making a styrene-butadiene copolymer is also disclosed, comprising polymerizing styrene and butadiene in an aqueous medium at a temperature of 40° C. or greater to produce an uncured styrene-butadiene copolymer, wherein the polymerizing step occurs in the absence of acid monomers and said method further includes the step of curing the styrene-butadiene copolymer with a sulfur-based curing agent to produce a cured non-carboxylated styrene-butadiene copolymer, in some embodiments, the method further includes the step of curing the styrene-butadiene copolymer with the sulfur-based curing agent to produce a cured non-carboxylated styrene-butadiene copolymer. In some embodiments, the polymerizing step occurs at a temperature of 50° C. or greater. The polymerizing step can include only styrene and butadiene monomers or can include other monomers (e.g., acrylonitrile) or molecular weight regulators. The resulting copolymers can have weight-average molecular weights, number-average molecular weights and gel contents as described above. The method can also include the step of modifying the copolymer dispersion to have an overall cationic charge. In some embodiments, the polymerization occurs in a single stage process.

A blend of copolymers is also disclosed comprising the high temperature polymerized styrene-butadiene copolymer and a second styrene-butadiene copolymer. In some embodiments, the second styrene styrene-butadiene copolymer can be a higher molecular weight styrene-butadiene copolymer polymerized at a temperature of less than 40° C. The blend of styrene-butadiene copolymers can be provided in water as an aqueous dispersion. For example, the blend can be prepared by mixing an aqueous dispersion comprising a first high temperature polymerized styrene-butadiene copolymer and an aqueous dispersion of the second styrene-butadiene copolymer. In some embodiments, the blend is cured after the mixing of the styrene-butadiene copolymers. In some embodiments, the first styrene-butadiene copolymer dispersion can have at least one first surfactant and the second styrene-butadiene copolymer dispersion can have at least one second surfactant, wherein the at least one first surfactant and the at least one second surfactant can include at least one common surfactant.

A polymer-modified asphalt composition is also disclosed including asphalt and the high temperature styrene-butadiene copolymer. In some embodiments, the asphalt composition is substantially free of water and can have, for example, a viscosity of less than 2000 cp at 135° C. In some embodiments, the asphalt composition further comprises water and the asphalt and the styrene-butadiene copolymer are dispersed in the water with a surfactant to form an asphalt emulsion. The asphalt composition can have the styrene-butadiene copolymer present in an amount of from 0.5% to 30% based on the total solids content of the styrene-butadiene copolymer and the asphalt. The asphalt composition can have a second styrene-butadiene copolymer. In some embodiments, the second styrene-butadiene copolymer can have a weight ratio of styrene to butadiene monomer units of 20:80 to 80:20 and can be polymerized at a temperature of less than 40° C.

A method of producing a polymer-modified asphalt is also disclosed, comprising blending asphalt and an aqueous dispersion of the high temperature polymerized styrene-butadiene copolymer at a blending temperature exceeding the boiling point of water. For example, the blending temperature can be 150° C. or greater. The polymer-modified asphalt can have a second styrene-butadiene copolymer. In some embodiments, the second styrene-butadiene copolymer can have a weight ratio of styrene to butadiene monomer units of 20:80 to 80:20 and can be polymerized at a temperature of less than 40° C.

A method of producing a polymer-modified asphalt emulsion is also disclosed comprising providing an aqueous asphalt emulsion and mixing the asphalt emulsion and an aqueous dispersion of the high temperature polymerized styrene-butadiene copolymer. In some embodiments, the aqueous dispersion can further include a second styrene-butadiene copolymer, for example, a copolymer having a weight ratio of styrene to butadiene monomer units of 20:80 to 80:20 and polymerized at a temperature of less than 40° C. In some embodiments, the aqueous dispersion of the styrene-butadiene copolymer (optionally including the second styrene-butadiene copolymer) can be agglomerated to increase the solids content.

The styrene-butadiene copolymer described herein can provide both the desired performance and viscosity for use in hot mix asphalt systems. The styrene-butadiene copolymer can be used alone or blended with other styrene-butadiene copolymers in either cured or uncured systems. Furthermore, curing the styrene butadiene copolymer produces only a minimal increase in viscosity when used in hot mix asphalt systems. The styrene-butadiene copolymer when used in asphalt emulsions imparts excellent elastic recovery and sweep performance to asphalt residues recovered from the emulsions that have been modified by the copolymer.

DETAILED DESCRIPTION

As described herein, the styrene-butadiene copolymer is made using a high temperature method by polymerizing monomers comprising styrene and butadiene (i.e., 1,3-butadiene) at a temperature of 40° C. or greater resulting in a styrene-butadiene copolymer comprising styrene and butadiene monomer units. The weight ratio of styrene to butadiene monomers used in the polymerization of the copolymer can be from 1:99 to 99:1 or from 20:80 to 80:20. The weight ratio can be 25:75 or greater, 30:70 or greater, 35:65 or greater, or 40:60 or greater. The weight ratio can be 70:30 or less, 60:40 or less, 50:50 or less, 40:60 or less, or 30:70 or less. In some embodiments, the weight ratio of styrene to butadiene monomer units in the copolymer is 25:75.

The copolymer is non-carboxylated and does not include acid monomer units. The copolymer can be derived from only styrene and butadiene monomers or can be derived from other monomers, i.e., include other monomer units. In some embodiments, the copolymer includes 10% or less by weight of other monomer units. For example, the copolymer can include at least one additional conjugated diene monomer (e.g., isoprene) or natural rubber. The copolymer can also include at least one additional vinyl aromatic monomer such as α-methylstyrene or o-chlorostyrene. Other suitable monomers include acrylonitrile, methacrylonitrile, acrylamide, and methacrylamide. In some embodiments, the one or more additional monomers can include at least one (meth) acrylic acid ester. For example, methyl, ethyl, n-butyl, isobutyl and 2-ethylhexyl acrylates and methacrylates can be used.

The copolymer can also include crosslinking monomers such as divinylbenzene. The crosslinking monomers when used in the copolymer can be present in an amount of from 0.2 to 5% and are considered part of the total amount of monomers used in the copolymer.

In some embodiments, the copolymer includes only styrene and butadiene monomer units, and optionally divinylbenzene monomer units. In some embodiments, the copolymer includes only styrene, butadiene and acrylonitrile monomer units, and optionally divinylbenzene monomer units. In some embodiments, the copolymer can have a $T_g$ of greater than −80° C. and less than 0° C.

As the copolymer is produced by high temperature polymerization, the copolymer includes more cis-1,4 butadiene units than cold polymerization styrene-butadiene copolymers. In some embodiments, the copolymer can include cis-1,4 butadiene units in an amount greater than 20% and trans-1,4 butadiene units in an amount less than 60% of the total number of butadiene units in the copolymer. In some embodiments, the copolymer can include cis-1,4 butadiene units in an amount greater than 30% and trans-1,4 butadiene units in an amount less than 55% of the total number of butadiene units in the copolymer.

In some embodiments, the copolymer has a soluble portion in tetrahydrofuran (THF) solvent that has a weight-average molecular weight, as measured by Gel Permeation Chromatography (GPC), of less than 400,000 g/mol, less than 350,000 g/mol, less than 300,000 g/mol, less than 250,000 g/mol, less than 200,000 g/mol, less than 150,000 g/mol, or less than 100,000 g/mol. In some embodiments, the copolymer has a number-average molecular weight, as measured by Gel Permeation Chromatography (GPC), of less than 20,000 g/mol, less than 19,000 g/mol, less than 18,000 g/mol, less than 17,000 g/mol, less than 16,000 g/mol, less than 15,000 g/mol, less than 14,000 g/mol, or less than 13,000 g/mol. The copolymer can have a polydispersity of 25 to 50, from 30 to 45, or from 34 to 42.

Copolymers with either low or high gel content, in combination with a range of molecular weight values, are provided herein. In the some embodiments, the copolymers have a low gel content (e.g., from 0% to 40%). For example, the gel content can be less than 40%, less than 30%, less than 25%, less than 20%, less than 15%, less than 10%, less than 5%, or 0%. The soluble portion of the copolymer can have a molecular weight as described above.

In the some embodiments, the copolymers have a high gel content (e.g., from 70% to 100%). For example, the gel content can be greater than 70%, greater than 75%, greater than 80%, greater than 85%, or greater than 90%, or greater than 95%. The soluble portion of the copolymer (if any) can have a molecular weight as described above.

In some examples, the styrene-butadiene copolymer can be crosslinked or cured (i.e., vulcanized) using a sulfur curing agent as described in more detail herein. Additional crosslinking or curing agents can be used such as divinylbenzene; 1,4-butanediol diacrylate; methacrylic acid anhydride; monomers containing 1,3-diketo groups (e.g., acetoacetoxyethyl(meth)acrylate or diacetonacrylamide); and monomers containing urea groups (e.g., ureidoethyl (meth)acrylate, acrylamidoglycolic acid, and methacrylamidoglycolate methyl ether); and silane crosslinkers (e.g., vinyl triethoxysilane, 3-methacryloxypropyl trimethoxysilane and 3-mercaptopropyl trimethoxysilane). Additional examples of crosslinkers include epoxy functionalized (metha)acrylate monomers (e.g., glycidyl methacrylate), N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters or triesters of dihydric and trihydric alcohols with α,β-monoethylenically unsaturated monocarboxylic acids (e.g., di(meth)acrylates, tri(meth) acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, the styrene-butadiene-based non-carboxylated copolymers can include from 0 to 5% by weight of one or more crosslinking monomers.

The styrene-butadiene copolymer can be provided in an aqueous dispersion. The styrene-butadiene copolymer dispersion can include one or more natural or synthetic anionic surfactants. The copolymer dispersions can have a solids content of 40% to 75%. The dispersions can have a solids content of 45% or greater, 50% or greater, 55% or greater, 60% or greater, or 65% or greater. The polymer dispersion can have an average particle size of 200 nm or less or 100 nm or less (e.g., 20-100 nm). The copolymer dispersion can have an overall anionic charge. In some embodiments, the copolymer dispersion can be "flipped" to modify the charge of the copolymer dispersion to have an overall cationic charge by adding one or more cationic, surfactants. Suitable cationic surfactants include, for example, REDICOTE® E-5 (Akzo Nobel, Chicago, Ill.), REDICOTE® E-11 (Akzo Nobel, Chicago, Ill.), REDICOTE® E-53 (Akzo Nobel, Chicago, Ill.), REDICOTE® E-606 (Akzo Nobel, Chicago, Ill.), REDICOTE® E-5127 (Akzo Nobel, Chicago, Ill.), ADOGEN® 477HG (Chemtura Corp., Greenwich, Conn.), INDULIN® W-1 (MeadWestvaco, Charleston, S.C.), INDULIN® W-5 (MeadWestvaco, Charleston, S.C.), INDULIN® SBT (MeadWestvaco, Charleston, S.C.), and INDULIN® MQK (MeadWestvaco, Charleston, S.C.). A non-ionic surfactant can also be used with the cationic surfactant. Suitable non-ionic surfactants include the TETRONIC™ and PLURONIC™ series of ethylene oxide-propylene oxide block copolymer surfactants sold by BASF Corporation, nonyl phenol ethoxylates, octylphenol ethoxylates, dodecyl phenol ethoxylates, linear alcohol ethoxylates, branched alcohol ethoxylates such as tridecyl alcohol ethoxylates, alcohol ethoxylates, block copolymers, PEG esters and castor oil ethoxylates.

The styrene-butadiene copolymer can be provided in an aqueous dispersion with at least one additional styrene-butadiene copolymer, for example, by mixing a first aqueous dispersion including the high temperature polymerized styrene-butadiene copolymer described above with a second aqueous dispersion including the additional styrene-butadiene copolymer. In some embodiments, at least one of the surfactants present in the first styrene-butadiene copolymer dispersion is the same as at least one of the surfactants in the second styrene-butadiene copolymer dispersion. In some embodiments where the styrene-butadiene copolymers are to be cured, the first styrene-butadiene copolymer dispersion and the second styrene-butadiene copolymer dispersion can be mixed prior to curing or one or both of the individual styrene-butadiene copolymer dispersions can be cured prior to mixing. In some embodiments where the styrene-butadiene copolymer dispersions are to be agglomerated, the first styrene-butadiene copolymer dispersion and the second styrene-butadiene copolymer dispersion can be mixed prior to agglomeration or one or both of the individual styrene-butadiene copolymer dispersions can be agglomerated prior to mixing. Further, in some embodiments where the styrene-butadiene copolymer dispersions are to be flipped, the first styrene-butadiene copolymer dispersion and the second styrene-butadiene copolymer dispersion can be mixed prior to flipping or both of the individual styrene-butadiene copolymer dispersions can be flipped prior to mixing.

The additional styrene-butadiene copolymer can be polymerized at a high temperature or can be polymerized at a low temperature at less than 40° C., e.g., at 5 to 25° C. In some embodiments, the additional styrene-butadiene copolymer is polymerized at a low temperature. The additional styrene-butadiene copolymer can have a styrene to butadiene monomer weight such as those described above for the high temperature styrene-butadiene copolymers described herein. The additional styrene-butadiene copolymer can also include additional monomers such as those described above for the high temperature styrene-butadiene copolymers described herein. The additional styrene-butadiene copolymer could also include acid monomer units, although low temperature SBR's will typically not include acid monomer units. In some examples, the additional styrene-butadiene copolymer can be crosslinked or cured using a sulfur curing agent. The additional styrene-butadiene copolymer can include cis-1,4 butadiene units in an amount less than 20% and trans-1,4 butadiene units in an amount greater than 60% of the total number of butadiene units in the copolymer. The additional styrene-butadiene copolymer can have a higher gel content (e.g., greater than 25%) and can have a soluble portion that has a weight-average molecular weight, as measured by Gel Permeation Chromatography (GPC), of greater than 400,000 g/mol, greater than 450,000 g/mol, or greater than 500,000 g/mol.

The high temperature polymerized styrene-butadiene copolymer can be prepared by polymerizing styrene and butadiene monomers in an aqueous emulsion polymerization reaction at a temperature greater than 40° C., greater than 50° C., or greater than 60° C. or at a temperature less than 100° C., less than 90° C. or less than 80° C. The high temperature polymerized styrene-butadiene copolymer can be produced using either a continuous, semi-batch (semi-continuous) or batch process. In some examples, the high temperature polymerized styrene-butadiene copolymer is produced using a continuous method by continuously feeding one or more monomer streams, a surfactant stream and an initiator stream to one or more reactors. The monomers in the one or more monomer streams can be fed at the desired butadiene to styrene weight ratio. A seed latex can also be initially charged to the reactor. In some embodiments, the polymerizing method using the high temperature polymerized styrene-butadiene copolymer can be produced using a single stage polymerization, e.g., through the use of a single reactor. In addition, uniform copolymer particles can be produced (and not block copolymers). In some embodiments, the polymerization method is performed in the absence of organic solvents such as N-methylpyrrolidone.

The surfactant stream includes a surfactant and water and can, in some embodiments, be combined with the initiator stream. The surfactant in the emulsion stream can be a synthetic or natural surfactant. For example, the surfactant can be a natural surfactant such as sodium or potassium oleate or the sodium or potassium salt of rosin acid. The surfactant can be present in the reactor in an amount from 0.5 to 5 weight percent, based on total monomer weight.

At a polymerization temperature of 70° C. or greater, a thermal initiator can be used in the reactor such as ammonium persulfate, potassium persulfate, or sodium persulfate. At temperatures of less than 70° C., the thermal initiator can be combined with or replaced by a redox initiator comprising a free radical generator, a reducing agent and an activator (e.g., a water-soluble metal salt).

Suitable free radical generators include organic peroxygen compounds such as benzoyl peroxide, hydrogen peroxide, di-t-butyl peroxide, dicumyl peroxide, 2,4-dichlorobenzoyl peroxide, decanoyl peroxide, lauroyl peroxide, diisopropylbenzene hydroperoxide, cumene hydroperoxide, p-methane hydroperoxide, α-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and the like; and alkyl perketals, such as 2,2-bis-(t-butylperoxy)butane, ethyl 3,3-bis(t-butylperoxy) butyrate, or 1,1-di-(t-butylperoxy) cyclohexane. In some embodiments, the free radical generator includes diisopropylbenzene hydroperoxide or p-methane hydroperoxide. The free radical generator is typically present in an amount between 0.01 and 1% by weight based on total monomer weight.

Suitable reducing agents for use in the initiator stream include sulfur dioxide; alkali metal disulfites; alkali metal and ammonium hydrogen sulfites; thiosulfate, dithionite and formaldehyde sulfoxylates; hydroxylamine hydrochloride; hydrazine sulfate; glucose and ascorbic acid. For example, the reducing agent can include sodium formaldehyde sulfoxylate dihydrate (SFS), sodium metabisulfite, or a mixture thereof. The reducing agent can be present in an amount between 0.01 and 1% by weight based on total monomer weight. In addition, the weight ratio of reducing agent to free radical generator can be between 0.2:1 and 1:1.

The water-soluble metal salt can be an iron, copper, cobalt, nickel, tin, titanium, vanadium, manganese, chromium or silver salt and can be chosen from a wide variety of water-soluble metal salts. Suitable water-soluble metal salts include copper (II) amine nitrate, copper (II) metaborate, copper (II) bromate, copper (II) bromide, copper perchlorate, copper (II) dichromate, copper (II) nitrate hexahydrate, iron (II) acetate, iron (III) bromide, iron (III) bromide hexahydrate, iron (II) perchlorate, iron (III) dichromate, iron (III) formate, iron (III) lactate, iron (III) malate, iron (III) nitrate, iron (III) oxalate, iron (II) sulfate pentahydrate, cobalt (II) acetate, cobalt (II) benzoate, cobalt (II) bromide hexahydrate, cobalt (III) chloride, cobalt (II) fluoride tetrahydride, nickel hypophosphite, nickel octanoate, tin tartrate, titanium oxalate, vanadium tribromide, silver nitrate, and silver fluosilicate. The metal can also be complexed with a compound, such as ethylenediaminetetraacetic acid (EDTA) to increase its solubility in water. For example, iron/EDTA complexes or cobalt/EDTA complexes can be used. The water-soluble metal salt can be present in an amount less than 0.01% by weight based on total monomer weight.

The polymerization reaction can be conducted in the presence of molecular weight regulators to reduce the molecular weight of the copolymer. Suitable molecular weight regulators include C8 to C12 mercaptans, such as octyl, nonyl, decyl or dodecyl mercaptans. In some embodiments, tert-dodecyl mercaptan is used as a molecular weight regulator. The amount of tert-dodecyl mercaptan used will depend upon the molecular weight that is desired for the copolymer. In some embodiments, the amount of molecular weight regulator is from 0.01 and 4% by weight (e.g., 0.1 to 1% by weight) based on total monomer weight.

The one or more monomer feeds, surfactant feed and initiator feed can be separately fed to a reactor where polymerization of the styrene and butadiene monomers occurs. The total amount of water in the reactors can be 60-75% by weight based on total monomer weight. The emulsion polymerization reaction normally produces between 60% and 80% conversion of the styrene and butadiene monomer into the styrene-butadiene copolymer particles.

Once the desired level of conversion is reached, the polymerization reaction can be terminated by the addition of a shortstop to the reactor. The shortstop reacts rapidly with free radicals and oxidizing agents, thus destroying any remaining initiator and polymer free radicals and preventing the formation of new free radicals. Exemplary shortstops include organic compounds possessing a quinonoid structure (e.g., quinone) and organic compounds that may be oxidized to a quinonoid structure (e.g., hydroquinone), optionally combined with water soluble sulfides such as hydrogen sulfide, ammonium sulfide, or sulfides or hydrosulfides of alkali or alkaline earth metals; N-substituted dithiocarbamates; reaction products of alkylene polyamines with sulfur, containing presumably sulfides, disulfides, polysulfides and/or mixtures of these and other compounds; dialkylhydroxylamines; N,N'-dialkyl-N,N'-methylenebishydroxylamines; dinitrochlorobenzene; dihydroxydiphenyl sulfide; dinitrophenylbenzothiazyl sulfide; and mixtures thereof. In some embodiments, the shortstop is hydroquinone or potassium dimethyl dithiocarbamate. The shortstop can be added in an amount between 0.01 and 0.1% by weight based on total monomer weight. However, the high temperature polymerization can be allowed to continue until complete monomer conversion, i.e., greater than 99%, in which case a shortstop may not be employed.

As mentioned above, the high temperature polymerized styrene-butadiene copolymer can also be produced using a batch process. In the batch process, the monomers, the surfactant, the free radical generator and water are all added to a reactor and agitated. After reaching the desired polymerization temperature, an activator solution if desired, that includes the reducing agent and the water soluble metal salt if desired can be added to initiate polymerization.

If a semi-batch process is used, the monomers, the surfactant in an aqueous solution, and the free radical generator in an aqueous solution are all fed to a reactor over a period of time, usually from 3 to 6 hours. If desired, an activator solution that includes a reducing agent and/or a water soluble metal salt can also be added in the reactor prior to commencing the other feeds or can be fed over a time interval to the reactor. The high temperature polymerized styrene-butadiene copolymer is preferably allowed to complete monomer conversion, i.e., greater than 99%, in which case a shortstop may not be employed. However, a shortstop, if desired, can be added to terminate the polymerization if the desired conversion level is less than 99%.

Once polymerization is terminated (in either the continuous, semi-batch or batch process), the unreacted monomers can be removed from the latex dispersion. For example, the butadiene monomers can be removed by flash distillation at atmospheric pressure and then at reduced pressure. The styrene monomers can be removed by steam stripping in a column. The resulting SBR copolymer dispersion at this point typically has a solids content of less than 50%.

The SBR copolymer dispersion can be agglomerated, e.g., using chemical, freeze or pressure agglomeration, and water removed to produce a solids content of greater than 50% to 75%. In some embodiments, the solids content is 55% or greater, 60% or greater, or 65% or greater. As described above, the high temperature SBR copolymer dispersion can be blended with an additional SBR copolymer dispersion prior to agglomeration. The agglomerated particles result in a polymer dispersion of larger particles with a broader particle size distribution. The agglomerated particles as described herein have a particle size of 100 nm to 5 μm. For example, the particle size can range from 100 nm to 2 μm or from 200 nm to 1 μm. The co-agglomerated dispersion, even once concentrated, can have a viscosity that allows it to readily flow (i.e., it does not gel). For example, an aqueous dispersion having a solids content greater than 60% can have a viscosity of less than 1000 cp at 20° C. The agglomeration of the high temperature polymerized styrene-butadiene copolymer dispersion can be performed when the SBR copolymer dispersion is in anionic form (prior to flipping).

An antioxidant can be added to the SBR latex dispersion to prevent oxidation of the double bonds of the SBR polymer, and can either be added before or after vulcanization of the SBR latex. The antioxidants can be substituted phenols or secondary aromatic amines. Exemplary substituted phenols include 2,6-di-t-butyl-p-cresol (DBT); 4,4'-thiobis(6-t-butyl-m-cresol); 3-t-butyl-4-hydroxyanisole (3-BHT); 2-t-butyl-4-hydroxyanisole (2-BHT); 2,2-methyl-enebis(4-methyl-6-t-butylphenol) (MBMBP); 2,2-methyl-enebis(4-ethyl-6-t-butylphenol) (MBEBP); 4,4'-butyliden-ebis(3-methyl-6-t-butylphenol) (SBMBP); 2,2-ethylidenebis(4,6-di-t-butylphenol); 2,6-di-t-butyl-4-sec-butylphenol; styrenated phenol; styrenated-p-cresol; 1,1,3-tris(2-methyl-4-hydroxy-5-t-butylphenol)butane; tetrakis[methylene-3-(3,5-di-t-butyl-4-hydroxyphenol)propionate] methane; n-octadecyl-3-(4-hydroxy-3,5-di-t-butylphenyl) propionate; triethylene glycol bis[3-(3-t-butyl-5-methyl-4-hydroxy-phenyl)propionate]; 1,3,5-trimethyl-2,4,6-tris(3,5-di-t-butyl-4-hydroxybenzyl)benzene; 2,2'-dihydroxy-3,3'-di (α-methylcyclohexyl)-5,5'-dimethyldiphenyl methane; 4,4-methylenebis(2,6-di-t-butylphenol); tris(3,5-di-t-butyl-4-hydroxyphenol); tris(3,5-di-t-butyl-4-hydroxyphenyl) isocyanurate; 1,3,5 tris(3',5'-di-t-butyl-4-hydroxybenzoyl) isocyanurate; bis[2-methyl-4-(3-n-alkylthiopropionyloxy)-5-t-butylphenyl]sulfide; 1-oxy-3-methylisopropylbenzene; 2,5-dibutylhydroquinone; 2,2'-methylenebis(4-methyl-6-nonylphenol); alkylated bisphenol; 2,5-di-t-amylhydroquinone; polybutylated bisphenol-A; bisphenol-A; 2,6-di-t-butyl-p-ethylphenol; 2,6-bis(2'-hydroxy-3-t-butyl-5'-methylbenzyl)-4-methylphenol; 1,3,5-tris(4-t-butyl-3-hydroxy-2,6-dimethylbenzyl)isocyanurate; terephthaloyl-di (2,6-dimethyl-4-t-butyl-3-hydroxybenzyl sulfide); 2,6-t-butylphenol; 2,6-di-t-butyl-2-dimethylamino-p-cresol; 2,2'-methylenebis(4-methyl-6-cyclohexylphenol);
hexamethylene glycol bis(3,5-t-butyl-4-hydroxyphenyl) propionate; (4-hydroxy-3,5-di-t-butylanilino)-2,6-bis(octyl-thio)-1,3,5-triazine; 2,2-thio[diethyl-bis-3-(3,5-di-t-butyl-4-hydroxyphenyl)propionate]; N,N'-hexamethylene(3,5-di-t-butyl-4-hydroxycinnamide); 3,5-di-t-butyl-4-hydroxybenzylphosphoric acid diethyl ester; 2,4-dimethyl-6-t-butylphenol; 4,4'-methylenebis(2,6-di-t-butylphenol); 4,4'-thiobis(2-methyl-6-t-butylphenol); tris[2-(3,5-di-t-butyl-4-hydroxyphenyl)propionyloxyethyl]isocyanurate; 2,4,6-tributylphenol; bis[3,3-bis(4'-hydroxy-3'-t-butylphenyl) butyric acid]glycol ester; 4-hydroxymethyl-2,6-di-t-butylphenol; and bis(3-methyl-4-hydroxy-5-t-butylbenzyl) sulfide. Exemplary secondary aromatic amines include N-phenyl-N'-isopropyl-p-phenylenediamine; N-phenyl N'-(1,3-dimethylbutyl)-p-phenylenediamine; N,N'-diphenyl-p-phenylenediamine; dioctyl-diphenylamine; dibetanaphthyl-p-phenylenediamine; 2,2,4-trimethyl-1,2-dihydroquinoline polymer and diaryl-p-phenylenediamine. In addition, sulfur containing antioxidants such as dilauryl thiodipropionate, distearyl thiodipropionate and 2-mercapto-benzimidazole; phosphorus containing antioxidants such as distearylpen-taerythritol diphosphite; nickel containing antioxidants such as nickel diisobutyldithiocarbamate, nickel dimethyldithio-carbamate and nickel di-n-butyldithiocarbamate; 2-mercap-totoluimidazole; zinc 2-mercaptotoluimidazole; and 1,11-(3, 6,9-trioxaundecyl)bis-3-(dodecylthio)propionate can be used. The antioxidant can be provided in an amount from 0.1 to 5.0 percent or from 0.5 to 2.0 percent by weight based on the weight of the SBR copolymer.

Antiozonants can also be added to the SBR copolymer dispersion to prevent ozone present in the atmosphere from cracking the SBR, by cleaving the double bonds of the SBR polymer. Typical antiozonants include waxes (e.g., VAN-WAX™ H commercially available from R. T. Vanderbilt Co., Inc.) and N,N'-alkylaryl, N—N' dialkyl and N,N'-diaryl derivatives of p-phenylenediamine such as N,N'-di(2-octyl)-p-phenylenediamine, N,N'-di-3(5-methylheptyl)-p-phe-nylenediamine, N-(1,3-dimethylbutyl)-N'-phenyl-p-phe-nylenediamine (e.g., ANTOZITE™ 67P commercially available from R. T. Vanderbilt Co., Inc.), N-isopropyl-N'-phenyl-p-phenylenediamine, and, N-cyclohexyl-N'-phenyl-p-phenylenediamine. The antiozonants can be provided in an amount from 0.5 to 10 percent, from 1 to 5 percent, or from 1.5 to 3 percent, by weight based on the weight of the SBR copolymer.

Prevulcanization inhibitors can also be added to the SBR dispersion to prevent premature vulcanization or scorching of the SBR polymer. For example, N-cyclohexylthio-phthal-imide; phthalic anhydride; N-cyclohexyl-thiophthalimide; N-phenyl-N-(trichloromethyl sulfenyl)-benzene sulfona-mide; bis-(sulfonamido)-sulfides or polysulfides (e.g., bis-(N-methyl-p-toluenesulfonamido)-disulfide); substituted thiophosphoramides (e.g., N-cyclohexylthio-N-phenyldieth-ylphosphoramide); N-(sulfenyl) methacrylamides; thio-sub-stituted-1,3,5-triazine, diamine or -triamines; 2-(thioamino)-

4,6-diamino-1,3,5-triazines; N,N'-substituted bis-(2,4-diamino-s-triazin-6-yl)-oligosulfides; and substituted thioformamidines can be used as prevulcanization inhibitors. In some embodiments, the prevulcanization inhibitor is N-cyclohexylthio-phthalimide (SANTOGARD™ PVI commercially available from Flexsys) or N-phenyl-N-(trichloromethyl sulfenyl)benzene sulfonamide (VULKALENT™ E commercially available from Bayer). The prevulcanization inhibitor is typically provided in an amount from 1 and 5 percent or from 1.5 to 3 percent by weight based on the weight of the SBR polymer.

The SBR dispersion can be vulcanized or cured to crosslink the SBR polymer thereby increasing the tensile strength and elongation of the rubber by heating the SBR, typically in the presence of vulcanizing agents, vulcanization accelerators, antireversion agents, and optionally crosslinking agents. Exemplary vulcanizing agents include various kinds of sulfur such as sulfur powder, precipitated sulfur, colloidal sulfur, insoluble sulfur and high-dispersible sulfur; sulfur halides such as sulfur monochloride and sulfur dichloride; sulfur donors such as 4,4'-dithiodimorpholine; selenium; tellurium; organic peroxides such as dicumyl peroxide and di-tert-butyl peroxide; quinone dioximes such as p-quinone dioxime and p,p'-dibenzoylquinone dioxime; organic polyamine compounds such as triethylenetetramine, hexamethylenediamine carbamate, 4,4'-methylenebis(cyclohexylamine) carbamate and 4,4'-methylenebis-o-chloroaniline; alkylphenol resins having a methylol group; and mixtures thereof. In some examples, the vulcanizing agents include sulfur dispersions or sulfur donors. The vulcanizing agent can be present from 0.1 to 15%, from 0.3 to 10%, or from 0.5 to 5%, by weight based on the weight of the SBR polymer.

Exemplary vulcanization accelerators include sulfenamide-type vulcanization accelerators such as N-cyclohexyl-2-benzothiazole sulfenamide, N-t-butyl-2-benzothiazole sulfenamide, N-oxyethylene-2-benzothiazole sulfenamide, N-oxydiethylene-2-benzothiazole sulfenamide, N-oxydiethylene-thiocarbamyl-N-oxydi ethylene sulfenamide, N-oxyethylene-2-benzothiazole sulfenamide and N,N'-diisopropyl-2-benzothiazole sulfenamide; guanidine-type vulcanization accelerators such as diphenylguanidine, di-o-tolylguanidine and di-o-tolylbiguanidine; thiourea-type vulcanization accelerators such as thiocarboanilide, di-o-tolyl-thiourea, ethylenethiourea, diethylenethiourea, dibutylthiourea and trimethylthiourea; thiazole-type vulcanization accelerators such as 2-mercaptobenzothiazole, dibenzothiazyl disulfide, 2-mercaptobenzothiazole zinc salt, 2-mereaptobenzothiazole sodium salt, 2-mercaptobenzothiazole cyclohexylamine salt, 4-morpholinyl-2-benzothiazole disulfide and 2-(2,4-dinitrophenylthio)benzothiazole; thiadiazine-type vulcanization accelerators such as activated thiadiazine; thiuram-type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid-type vulcanization accelerators such as sodium dimethyldithiocarbamate, sodium diethyldithiocarbamate, sodium di-n-butyldithiocarbamate, lead dimethyldithiocarbamate, lead diamyldithiocarbamate, zinc diamyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbaniate, tellurium diethyldithiocarbamate, bismuth dimethyldithiocarbamate, selenium dimethyldithiocarbamate, selenium diethyldithiocarbamate, cadmium diethyldithiocarbamate, copper dimethyldithiocarbamate, iron dimethyldithiocarbamate, diethylamine diethyldithiocarbamate, piperidinium pentamethylene dithiocarbamate and pipecoline pentamethylene dithiocarbamate; xanthogenic acid-type vulcanization accelerates such as sodium isopropylxanthogenate, zinc isopropylxanthogenate and zinc butylxanthogenate; isophthalate-type vulcanization accelerators such as dimethylammonium hydrogen isophthalate; aldehyde amine-type vulcanization accelerators such as butyraldehyde-amine condensation products and butyraldehyde-monobutylamine condensation products; and mixtures thereof. The vulcanization accelerator can be present within a range of from 0.1 to 15%, from 0.3 to 10%, or from 0.5 to 5%, by weight based on the weight of the SBR polymer.

Antireversion agents can also be included in the vulcanization system to prevent reversion, i.e., an undesirable decrease in crosslink density. Suitable antireversion agents include zinc salts of aliphatic carboxylic acids, zinc salts of monocyclic aromatic acids, bismaleimides, biscitraconimides, bisitaconimides, aryl bis-citraconamic acids, bissuccinimides, and polymeric bisuccinimide polysulfides (e.g., N,N'-xylenedicitraconamides). The antireversion agent can be present in a range of from 0 to 5%, from 0.1 to 3%, or from 0.1 to 2% by weight based on the weight of the SBR polymer.

The above additives (antioxidants, antiozonants, prevulcanization inhibitors, vulcanizing agents, vulcanization accelerators and antireversion agents) can be mixed with the SBR latex dispersion. Crosslinking agents can also be included in the vulcanization system in small amounts to facilitate crosslinking of the SBR polymer chains and are typically organic peroxides. The SBR latex dispersion can be vulcanized at an elevated temperature and pressure and the vulcanization process is well understood by those skilled in the art.

As noted above, the high temperature polymerized styrene-butadiene copolymer dispersions can be blended with low temperature polymerized styrene-butadiene copolymer dispersions produced at a temperature below 40° C. (e.g., 5° C. to 25° C.). It is noted that the low temperature polymerized styrene-butadiene copolymer dispersions can be produced using the method described above for the high temperature polymerized styrene-butadiene copolymer dispersions except at lower temperatures.

The high temperature styrene butadiene copolymers and dispersions thereof can be used in various applications. For example, the high temperature styrene butadiene copolymer can be used in vehicle tires, carpet backing, adhesives, foams, and paper coatings. In some embodiments, the high temperature styrene butadiene copolymers are used in asphalt-based systems such as hot mix asphalt and asphalt emulsions.

In some embodiments, the high temperature styrene butadiene copolymer can be used in hot mix asphalt formulations. A polymer-modified hot mix asphalt can be prepared, for example, by blending asphalt and an aqueous dispersion of the high temperature polymerized styrene-butadiene copolymer at a blending temperature exceeding the boiling point of water. For example, the blending temperature can be 150° C. or greater or 160° C. or greater. The high temperature polymerized styrene-butadiene copolymer can be blended with a second styrene-butadiene copolymer as discussed herein. The polymer-modified hot mix asphalt composition is substantially free of water and can have, for example, a viscosity of 3000 cp or less, less than 2000 cp, or less than 1500 cp at 135° C. In some embodiments, the addition of the high temperature styrene-butadiene copolymer, alone or in a blend, to the hot mix asphalt composition can result in an increase in viscosity of less than 125%, less than 100%, less than 75% or less than 50%. The styrene-butadiene copolymer can be present in an amount of from 0.5% to 30% based on the total solids content of the styrene-butadiene copolymer and the asphalt. For example, the copolymer can be present in an amount of 1% or more, 1.5% or more, 2% or more, 2.5% or more, or 3% or more or can be present in an amount of 25% or less, 20% or less, 15% or less, 10% or less, 7.5% or less or 5% or less. In some embodiments, the polymer-modified hot mix asphalt composition can have a viscosity of less than 3000 cp at 135° C. when it includes 3% or more of the copolymer (e.g. 3.5%, 4%, 4.5%, 5%, 5.5% or 6%). In addition, the copolymers described herein have the potential to impart manageable viscosities to hot asphalt (e.g. at 135° C.) up to levels of 20 wt % latex polymer. As noted herein, the high temperature polymerized styrene-butadiene copolymer can be cured prior to being blended with the asphalt. In some embodiments, the high temperature polymerized styrene-butadiene copolymer can be blended with the asphalt and then cured. The polymer-modified hot mix asphalt formulations can be used for paving to produce road surfaces or can be used in asphalt shingles.

In some embodiments, the high temperature styrene butadiene copolymer can be used in an asphalt emulsion. The polymer-modified asphalt emulsion includes the asphalt and the styrene-butadiene copolymer dispersed in the water with a surfactant. The polymer-modified asphalt emulsion can be produced by providing an aqueous asphalt emulsion and mixing the asphalt emulsion and an aqueous dispersion of the high temperature styrene-butadiene copolymer. In some embodiments, the aqueous dispersion can further include a second styrene-butadiene copolymer as described herein. In some embodiments, the aqueous dispersion of the styrene-butadiene copolymer (optionally including the second styrene-butadiene copolymer) can be agglomerated to increase the solids content. The styrene-butadiene copolymer can be present in an amount of from 0.5% to 30% based on the total solids content of the styrene-butadiene copolymer and the asphalt. For example, the copolymer can be present in an amount of 1% or more, 1.5% or more, 2% or more, or 2.5% or more or can be present in an amount of 25% or less, 20% or less, 15% or less, 10% or less, 7.5% or less or 5% or less. The resulting asphalt emulsions can be used, for example, to maintain paved asphalt road surfaces by employing different surface treatments including microsurfacing.

The following non-limiting examples are now provided. Except where otherwise indicated, percentages are on a per weight basis and solutions are aqueous solutions.

EXAMPLES

Latex Preparation Using Hot Polymerization

Styrene (50 parts by weight of the total monomers), tert-dodecyl mercaptan (0.1 to 2.0 parts by weight of the total monomers), butadiene (50 parts by weight of the total monomers), and an aqueous solution of sodium persulfate initiator (0.3 parts by weight of the total monomers), were added over 6 hours to a pre-heated reactor (70° C.) initially containing water, sodium hydroxide (0.14 parts by weight of the total monomers), a polystyrene seed latex (1.66 parts by weight of the total monomers), and TRILON BX (0.03 parts by weight of the total monomers), an ethylenediaminetetraacetic acid commercially available from BASF Corporation (Florham Park, N.J.). The stabilization of the latex particles during polymerization was accomplished by feeding an aqueous solution of potassium oleate surfactant (3.6 parts by weight of the total monomers) over the course of the polymerization. The temperature was maintained at 70° C. throughout the polymerization reaction. Following the polymerization process, the latex dispersion was stripped of the residual monomers to provide an aqueous dispersion with residual styrene levels of less than 400 ppm.

Latex Polymer-Modified Asphalt Sample Preparation

Asphalt cement was preheated to 160° C.+/−3° C. for at least two hours and then 650 grams of the heated asphalt cement was poured into a metallic can. The asphalt-containing can was heated to 170° C.+/−3° C. using a heating mantle. A blade was inserted at an angle at approximately 20° in the middle of the can to provide optimum mixing. The latex prepared according to the method described above was added slowly to the hot asphalt with mixing at 300-325 rpm. Unless otherwise specified, the amount of latex polymer solids added to the asphalt was 3 wt %/0 based on the total solids content of the latex polymer and asphalt. After each addition, time was allowed for most of the bubbling to cease and then the mixer speed was increased to approximately 400-700 rpm to blend the resulting mixture. After latex addition, the mixing was continued for two additional hours to achieve an equilibrated asphalt polymer mixture. Samples of the polymer modified asphalts were taken for viscosity measurement or poured into molds for any desired testing.

SHRP Binder Testing of Latex Polymer-Modified Asphalt

The Strategic Highway Research Program (SHRP) evaluation of latex polymer modified asphalts was carried out according to the ASTM D7175 or AASHTO T315 procedure on the original latex polymer modified asphalt, on the latex polymer modified asphalt following Rolling Thin-Film Oven (RTFO) exposure, and also on the RTFO conditioned latex polymer modified asphalt that was conditioned in the Pressure Aging Vessel (PAV). The Dynamic Shear Rheometer (DSR) tests measure the dynamic shear modulus and stiffness of the latex polymer modified asphalt. In addition, Bending Beam Rheometer (BBR) testing was carried out according to ASTM D6678 or AASHTO T313 to measure the low temperature stiffness characteristics of the latex polymer modified asphalt binders. Testing of the original (unaged or fresh) latex polymer modified asphalt and of the latex polymer modified asphalt after RTFO exposure provided the High Temperature in the Performance Grade (PG) scale. Testing of the latex polymer modified asphalt after RTFO and PAV exposure provided the stiffness at intermediate temperatures related to fatigue resistance and BBR testing after RTFO and PAV exposure provided the Low Temperature in the PG scale.

Viscosity of Latex Polymer-Modified Asphalt

The viscosities of the latex polymer modified asphalts prepared according to the methods described above were measured according to ASTM D4402 or AASHTO T316 (American Association of State Highway and Transportation Officials).

Elastic Recovery of Latex Polymer-Modified Asphalt

The elastic recoveries of latex polymer modified asphalt binders prepared according to the methods described above were measured using a ductilometer according to a modified ASTM D6084 Procedure B testing protocol.

Comparative Examples 1-2 and Examples 1-3

A styrene-butadiene copolymer, prepared by cold polymerizing (i.e., at a temperature of 25° C. or lower) styrene and butadiene, was provided as an aqueous dispersion (Polymer A). Polymer A has a number-average molecular weight (Mn) of 13,000 Daltons, a weight-average molecular weight of 507,000 Daltons, and a polydispersity of 39. Polymer B was prepared by hot polymerizing 51% styrene and 49% butadiene at 70° C. Polymer C was prepared by combining 50 weight % of Polymer A with 50 weight % of Polymer B, on a polymer solids basis, to form a resulting polymer with a styrene-butadiene ratio of 36.6 to 63.4. Polymer C has a number-average molecular weight (Mn) of 9,800 Daltons, a weight-average molecular weight of 373,000 Daltons, and a polydispersity of 38. Polymer A (3% by weight) was hot-mixed with Nustar 64-22, a commercially available asphalt from NuStar Asphalt Refining LLC (Savannah, Ga.) having a 64-22 performance grade, to provide Comparative Example 1. Polymer C (3% by weight) was hot-mixed with Nustar 64-22 asphalt to provide Example 1. Comparative Example 2 was prepared by hot-mixing Polymer A (3% by weight) with Nustar 64-22 asphalt and 2.1 weight % (based on the total latex solids) active sulfur dispersion curing agent containing a vulcanization accelerator. Example 2 was prepared by hot-mixing Polymer C (3% by weight) with Nustar 64-22 asphalt and 2.1 weight % (based on the total latex solids) active sulfur dispersion curing agent containing a vulcanization accelerator. Example 3 was prepared similarly to Example 2 except Polymer B was used in place of Polymer C. NuStar 64-22 was provided as the control. The PG grades and viscosities for the asphalts were determined (Table 1).

TABLE 1

|  | Control | Comp. Ex. 1 | Ex. 1 | Comp. Ex. 2 | Ex. 2 | Ex. 3 |
| --- | --- | --- | --- | --- | --- | --- |
| PG Grades Passed | 64-22 | 76-22 | 76-28 | 76-22 | 76-28 | 76-28 |
| SHRP Hi grade | 64 | 76 | 76 | 76 | 76 | 76 |
| SHRP Lo grade | −22 | −22 | −28 | −22 | −28 | −28 |
| Brookfield Viscosity (cps) | 654 | 2158 | 1409 | 2387 | 1466 | 1216 |
| Limiting High Temp (° C.) | 69.5 | 80.7 | 77.1 | 79.6 | 77.6 | 76.2 |
| Limiting Low Temp (° C.) | −26.4 | −24 | −28.1 | −26.4 | −28.6 | −29.1 |
| Temp Range (° C.) | 95.8 | 104.7 | 105.3 | 106.1 | 106.3 | 105.2 |

As shown in Table 1, the viscosities of the asphalt samples modified with hot polymerized styrene-butadiene latexes (Examples 1, 2, and 3) decreased to an appropriate level as compared to the viscosities of the asphalt samples modified with the cold polymerized styrene-butadiene latexes (Comparative Examples 1 and 2). Also, the asphalts prepared with the hot polymerized styrene-butadiene latexes (Examples 1, 2, and 3) displayed a higher performance grade than the asphalts prepared with cold polymerized latexes (Comparative Examples 1 and 2).

Comparative Example 3 and Example 4

Comparative Example 3 was prepared by hot-mixing Polymer A (3% by weight) with ERGON AC-20, an asphalt commercially available from Ergon, Inc. (Jackson, Miss.). Example 4 was prepared by hot-mixing Polymer C (3% by weight) with ERGON AC-20. The PG grades and viscosities for the asphalts were determined (Table 2).

TABLE 2

|  | Comp. Ex. 3 | Ex. 4 |
| --- | --- | --- |
| PG Grades Passed | 64-22 | 64-22 |
| SHRP Hi grade | 64 | 64 |
| SHRP Lo grade | −22 | −22 |
| Brookfield Viscosity (cps) | 1446 | 963 |
| Limiting High Temp (° C.) | 69.7 | 67.9 |
| Limiting Low Temp (° C.) | −27.6 | −26.7 |
| Temp Range (° C.) | 97.4 | 94.6 |

As shown in Table 2, the viscosity of the asphalt sample modified with a hot polymerized styrene-butadiene latex (Example 4) decreased as compared to the viscosity of the asphalt samples modified with the cold polymerized styrene-butadiene latexes (Comparative Example 3). The performance grades of the asphalts were comparable.

Comparative Examples 1-2 and Examples 1-3 and 5

Comparative Examples 1-2 and Examples 1-3 were prepared as described above. Example 5 was prepared by hot-mixing Polymer B (3% by weight) with Nustar 64-22 asphalt. NuStar 64-22 was provided as the control. The viscosities of the hot asphalt samples were determined (Table 3).

TABLE 3

| Identification | Description | Viscosity (cp at 135° C.) |
| --- | --- | --- |
| Control | Unmodified asphalt sample | 650 |
| Comparative Example 1 | Polymer A (3 wt %) modified asphalt sample | 2155 |
| Comparative Example 2 | Polymer A (3 wt %) modified asphalt sample with curing agent (2.1 wt %) | 2387 |
| Example 1 | Polymer C (3 wt %) modified asphalt sample | 1404 |
| Example 2 | Polymer C (3 wt %) modified asphalt sample with curing agent (2.1 wt %) | 1466 |
| Example 5 | Polymer B (3 wt %) modified asphalt sample | 1208 |
| Example 3 | Polymer B (3 wt %) modified asphalt sample with curing agent (2.1 wt %) | 1216 |

As shown in Table 3, the viscosities of the asphalt samples modified with hot polymerized styrene-butadiene latexes (Examples 1 and 5) were not substantially different from the viscosities of the asphalt samples modified with hot polymerized styrene-butadiene latexes treated with curing agent (Examples 2 and 3).

Examples 6-7

Example 6 was prepared by hot-mixing Ergon AC-20 asphalt with 3 wt % of Polymer A, Polymer A with curing agent, and Polymer B. Example 7 was prepared by hot-mixing NuStar 64-22 asphalt with 3 wt % of Polymer A, Polymer A with curing agent, and Polymer B. The viscosities of the hot asphalt samples were determined (Table 4).

TABLE 4

| Polymer (3 wt %) in Asphalt | Asphalt Viscosity at 135° C. (cp) | |
|---|---|---|
| | Example 6 | Example 7 |
| Polymer A | 1446 | 2155 |
| Polymer A + curing agent (2.1%) | 1775 | 2387 |
| Polymer B | 733 | 1208 |

As shown in Table 4, the viscosities of the asphalt samples prepared by hot-mixing hot polymerized styrene-butadiene latexes (Polymer B) decreased as compared to those asphalt samples prepared by hot-mixing cold polymerized styrene-butadiene latexes with and without curing agent (Polymer A and Polymer A with curing agent). The asphalt sample containing Polymer B was 49% and 44% less viscous than the asphalt sample containing Polymer A for Ergon AC-20 and NuStar 64-22, respectively. Further, the asphalt sample containing Polymer B was 59% and 49% less viscous than the asphalt sample containing Polymer A and a curing agent for Ergon AC-20 and NuStar 64-22, respectively.

Comparative Example 4 and Examples 8-10

An asphalt emulsion comprising asphalt, water, one or more emulsifiers and Polymer A was prepared and 2.1 weight % curing agent, 4 parts of a cationic surfactant and 2 parts of a non-ionic surfactant were post-added to the emulsion to form Comparative Example 4. Example 8 was prepared by mixing 80 parts of Polymer A with 20 parts of Polymer B, based on polymer solids, forming an asphalt emulsion comprising asphalt, water, one or more emulsifiers, Polymer A and Polymer B in the aforementioned ratio, and post-adding 2.1 weight % curing agent, 4 parts of a cationic surfactant and 2 parts of a non-ionic surfactant. Example 9 was prepared by forming an asphalt emulsion comprising asphalt, water, one or more emulsifiers, Polymer C, and post-adding 2.1 weight % curing agent, 4 parts of cationic surfactant, and 2 parts of non-ionic surfactant as in Example 8. Example 10 was prepared similarly to Example 9 except Polymer B was used in place of Polymer C. The elastic recovery and sweep performance for the asphalt emulsions were determined (Table 5).

TABLE 5

| | Comp. Ex. 4 | Ex. 8 | Ex. 9 | Ex, 10 |
|---|---|---|---|---|
| Elastic Recovery (%) | 57.5 | 60.0 | 58.3 | 53.3 |
| Sweep Performance (%) | 7.14 | 4.61 | 4.96 | 3.47 |

As shown in Table 5, the elastic recoveries of the asphalt emulsions containing hot polymerized styrene-butadiene latexes (Examples 8, 9, and 10) were comparable to the asphalt emulsion containing a cold polymerized styrene-butadiene latex (Comparative Example 4) and within an acceptable range of greater than 50%. The sweep performances of the asphalt emulsions containing hot polymerized styrene-butadiene latexes (Examples 8, 9, and 10) were lower than the asphalt emulsion containing a cold polymerized styrene-butadiene latex (Comparative Example 4), demonstrating the hot polymerized styrene-butadiene containing emulsions possess stronger binding properties.

The compositions and methods of the appended claims are not limited in scope by the specific compositions and methods described herein, which are intended as illustrations of a few aspects of the claims and any compositions and methods that are functionally equivalent are intended to fail within the scope of the claims. Various modifications of the compositions and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. A polymer-modified asphalt composition, comprising asphalt; and
a styrene-butadiene copolymer comprising styrene and butadiene monomer units, wherein said copolymer is cured with a sulfur curing agent, is non-carboxylated, and is polymerized at a temperature of 40° C. or greater, and wherein the cis-1,4 butadiene units are greater than 20% and the trans-1,4 butadiene units are less than 60% of the total number of butadiene units in the copolymer.

2. The asphalt composition of claim 1, wherein the composition is substantially free of water.

3. The asphalt composition of claim 2, having a viscosity of less than 2000 cp at 135° C.

4. The asphalt composition of claim 1, further comprising water, wherein the asphalt and the styrene-butadiene copolymer are dispersed in the water with a surfactant to form an asphalt emulsion.

5. The asphalt composition of claim 1, wherein the styrene-butadiene copolymer is present in an amount of from 0.5% to 30% based on the total solids content of the styrene-butadiene copolymer and the asphalt.

6. The asphalt composition of claim 1, further comprising a second styrene-butadiene copolymer having a weight ratio of styrene to butadiene monomer units of 20:80 to 80:20 and polymerized at a temperature of less than 40° C.

* * * * *